Patented Dec. 15, 1953

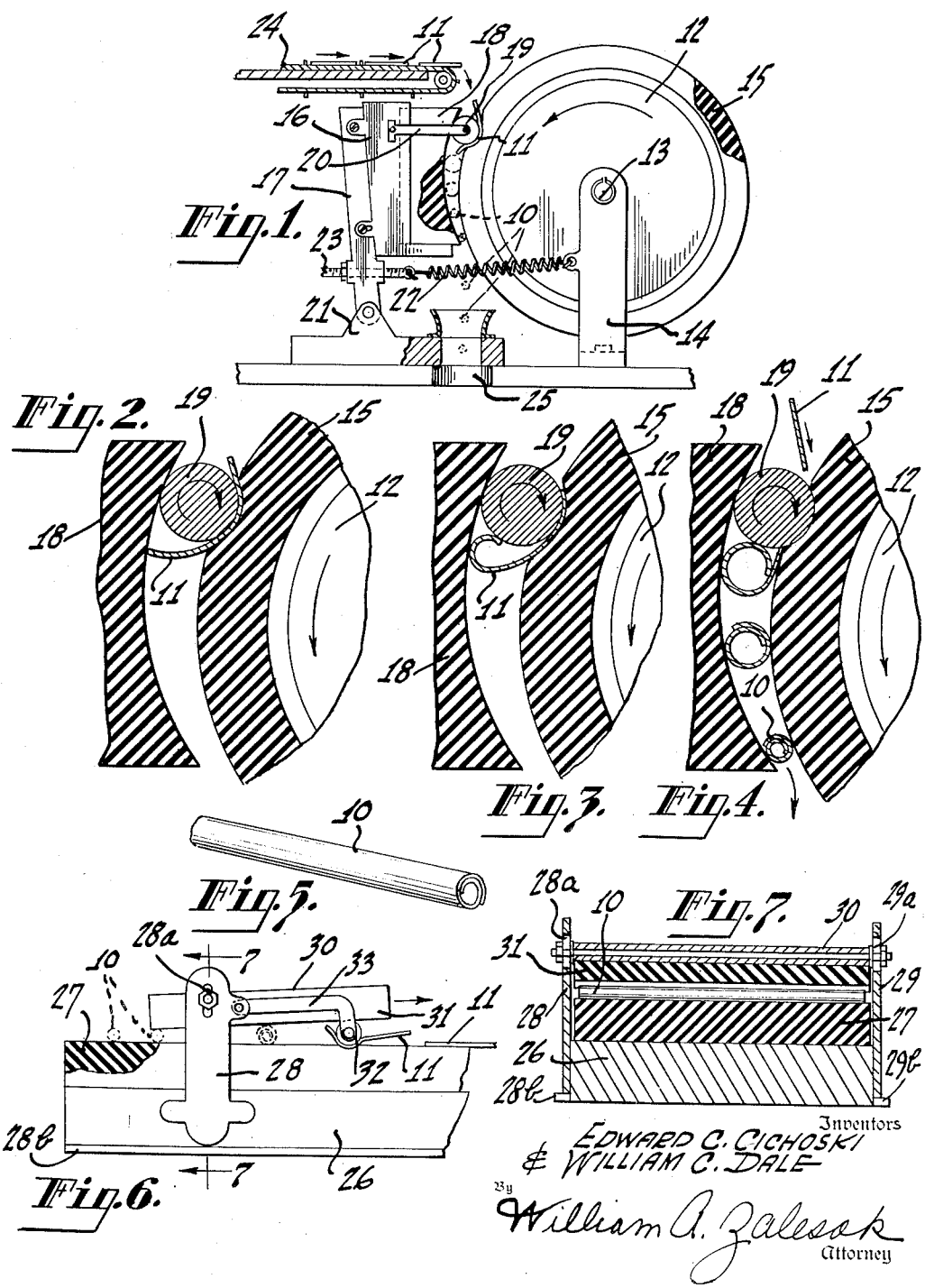

2,662,573

UNITED STATES PATENT OFFICE 2,662,573

METHOD AND APPARATUS FOR FORMING THIN-WALLED METAL SLEEVES

Edward C. Cichoski, Jersey City, and William C. Dale, Basking Ridge, N. J., assignors to Radio Corporation of America, a corporation of Delaware Application June 20, 1950, Serial No. 169,202

10 Claims. (Cl. 153—64)

Our invention relates to a method and apparatus for fabricating thin walled metal sleeves and more particularly to a method and apparatus for rolling metal foil to sleeve form of relatively small diameter.

The present trend of reducing the size of electron discharge devices involves also a reduction in the diameter and wall thickness of sleeves employed in such devices, such for example, as supports for cathodes or other elements. In some devices sleeves are required that have a wall thickness substantially equivalent to that of metal foil. For example, the thickness of the metal may be of the order of .0005" and the sleeve diameter may be about .025".

One method practiced heretofore for making small sized sleeves from foil-thin metal sheets has involved wrapping the metal sheets around a mandrel of predetermined diameter. An objection to this method is that it requires manual removal of the formed sleeve from the mandrel. This usually requires the removal of the mandrel from the apparatus of which it is a part. Even with careful handling there is the danger of deforming the relatively fragile sleeves during such removal from the mandrel. Obviously this method does not permit of a fast, continuous and automatic operation.

Another objection to prior methods requiring the sleeve to be wrapped around a mandrel is the need for a specific mandrel for each different size sleeve desired. This necessitates a relatively large supply of differently sized mandrels.

Accordingly, an object of our invention is to provide an improved method and apparatus for making thin walled metal sleeves that avoids the objections of prior practices.

Another object is to provide a continuous, fast and automatic method of making sleeves of relatively small diameter from relatively thin material.

A further object is to provide a method and apparatus for forming a sleeve having a diameter determined solely by forces acting on the outer surfaces of the sleeve.

Another object is to provide a method and apparatus for forming sleeves without requiring engagement with the inner surface of the sleeve, thereby eliminating the need for specific sized mandrels and permitting the finished sleeve to fall free.

A further object is to provide a method and apparatus for fabricating sleeves from sheet metal wherein the diameter of the sleeve is determined by two spaced surfaces.

A further object is to provide an apparatus for making metal sleeves wherein the elements thereof are adjustable to provide any desired sleeve diameter without replacing said elements.

Another object is to provide a forming apparatus utilizing the modulus of elasticity and spring back characteristics of sheet metal for forming sleeves therefrom.

A further object is to provide a method of making metal sleeves from flat metal stock whereby a portion of the stock is given a curvature beyond its elastic limit and subsequently rolled to provide a sleeve.

Another object is to provide a method and apparatus for simultaneously forming a metal sleeve and conveying the sleeve to a discharge location.

A further object is to provide an apparatus and method for making metal sleeves wherein the sleeve stock is first given a predetermined curvature beyond its elastic limit, and then rolled to form the sleeve to a predetermined radius smaller than the radius of said predetermined curvature.

Our novel method accomplishes the foregoing objects by providing the steps of initially curving a leading portion of flat metal stock beyond its elastic limit to form a persistent curvature therein, whereby the leading edge of the stock is raised from the plane of other portions of the stock; and then successively engaging the leading curved end and other portions of the stock by two spaced relatively movable surfaces, respectively, to add further curvature to the leading curved end, and to roll the stock by the relative movement referred to to form a sleeve of predetermined diameter, the diameter being dependent upon the spacing between the two surfaces referred to. This spacing may be adjusted to provide a sleeve of a desired diameter.

Our novel apparatus for accomplishing the foregoing objects includes a structure comprising two spaced and preferably converging and relatively movable surfaces made of resilient material such as rubber, and an elongated roller fixed against rectilinear movement with respect to one of said surfaces and movable rectilinearly with respect to the other surface. The roller extends transversely of the direction of the relative movement of the surfaces and is free to rotate on its axis. It is partly embedded in said other surface.

In practice, the sheet metal stock to be formed into a sleeve is fed between the roller referred to and the surface into which the roller is partly embedded. This causes the leading end portion of the stock to be curved as a consequence of being urged against the roller surface by the compressed portion of the surface in which the roller is embedded. The entrance of the roller into this surface is such as to cause a curvature in the stock having a displacement greater than the elastic limit of the stock so that when the leading portion of the stock leaves the area of contact between the roller and the surface referred to, it retains a curvature even after some springback occurs. Further feed of the stock resulting from relative movement of the roller and the surface in which it is partly embedded causes the curved leading end of the stock to travel to the other surface and contact a portion thereof spaced from the roller. Engagement between the other surface referred to and the leading end of the stock results in further curvature of this leading end. Further feed of the stock causes the leading end thereof to curve back on itself to form a sleeve. When the entire stock referred to is curved to form a sleeve, the resultant sleeve is spaced from the roller and is of slightly smaller diameter than the roller. Further relative movement of the surfaces causes the formed sleeve to be rolled therebetween and to travel to the converging ends of the surfaces with resultant further reduction in its diameter. The finished sleeve is discharged from the converging ends of the surfaces into a suitable receptacle. The spacing between the converging ends of the surfaces may be adjusted to provide a sleeve of any desired diameter.

The apparatus may also include an automatic feed of the sheet metal stock to be formed into sleeves, to render the apparatus automatic, continuous and fast in operation. No manual handling of the sleeve is required during its fabrication thereby avoiding the hazard of deformation from such handling.

While the invention is pointed out with particularity in the appended claims, it may best be understood from the following detailed description of several embodiments thereof presented for illustrative purposes only, taken in connection with the appended drawing in which:

Figure 1 is an elevation partly in section of an automatically operable apparatus incorporating our invention;

Figures 2, 3 and 4 are fragmentary sectional elevations of a portion of the apparatus shown in Figure 1 and depicts progressive stages in the fabrication of a sleeve;

Figure 5 is a perspective view of a sleeve made by the method and apparatus of the invention;

Figure 6 is an elevation partly in section of a manually operable apparatus according to the invention; and Figure 7 is a view in cross section taken along the line 7—7 of Figure 6.

Referring now in more detail to the drawing, there is shown in the several figures thereof two embodiments of the invention which are presented for purposes of illustration only and not by way of limitation. In Figures 1 to 4 there is shown an apparatus that is automatically operable for fabricating a sleeve according to the invention. Figures 6 and 7 illustrate a manually operable apparatus according to the invention. Figure 5 shows a sleeve so formed in accordance with the invention.

Each apparatus referred to has certain advantages to be described below herein and each involves principles characterizing our novel method of making sleeves.

*The automatically operable apparatus*

The automatically operable apparatus shown in Figure 1 includes a drum 12 mounted on a shaft 13 for rotation in the direction of the arrow. A fixed standard 14 is disposed at each end of the drum 12 for engaging the shaft 13. The drum 12 is provided with a peripheral layer 15 of resilient material such as rubber for a purpose to be described. The drum 12 has a length at least as great as that of the sleeve to be formed by the apparatus. Power means not shown serves to impart rotation to the drum 12 at a predetermined velocity.

To one side of the drum 12 and in predetermined space relation thereto is disposed an assembly comprising a backing support 16 adjustably fixed to arm 17, a body 18 of resilient material such as rubber held by said backing support, an elongated metal roller 19 mounted on bracket 20 for rotation, the bracket 20 being in turn fixed to support 16. The arm 17 is mounted for rotation on a support 21. A spring 22 is fixed at one end to arm 17 by an adjustable screw 23 and at the other end to the standard 14 for urging the facing surfaces of drum 12 and the body 18 together and roller 19 against the drum, with a predetermined pressure. This pressure should be sufficient to cause the roller 19 to become partly embedded into the peripheral body 15 on the drum 12 for a purpose to be described.

The facing surfaces of the drum 12 and the body 18 form a curved space wider at the upper end than at the lower end as viewed in Figure 1. This is an important feature of the apparatus and its significance will become apparent as the description proceeds.

Above the assembly referred to is disposed an endless conveyor 24 adapted to feed flat metal blanks or stock 11 to the apparatus at a predetermined rate. Below the assembly is positioned a chute 25 for receiving finished sleeves. The conveyor 24 may directly enter a hopper, not shown containing a supply of blanks and the chute 25 may be associated with a further conveyor or utilization station, to thereby render the apparatus completely automatic, continuous and fast in operation.

*Operation of automatically operable apparatus*

In operation, travel of the upper surface of conveyor 24 to the right as viewed in Figure 1 will cause a blank 11 carried thereby to drop downwardly and between the roller 19 and the drum 12. Rotation of drum 12 also causes roller 18 to rotate, thus drawing the blank between the relatively hard surface of the roller and the relatively soft surface of the peripheral body 15 on the drum. This will cause the leading end portion of the blank to initially follow the curvature of the roller 19. However, when the leading end portion of the blank emerges from engagement with the roller and drum it will spring back to a limited extent thereby losing some of its curvature. But even after rebound the leading end of the blank will have some curvature and will therefore travel in the direction of the body 18 as shown in Figure 1. When the leading end of the blank contacts the body 18 as shown in Figure 2, the contact will occur at a location on body 18 spaced from roller 19.

Engagement between the leading end of the blank and the body 18 will cause this end to be relatively sharply curved as shown in Figure 3 and extend in the direction of drum 12. Further feed of the blank causes the leading end thereof to curve back on itself as shown in Figure 4 to form a sleeve. A further rotation of drum 12 causing relative movement between the peripheral body 15 thereon and the body 18 results in a rolling of the initially formed sleeve between the facing surfaces of these bodies. Due to the convergence of the facing surfaces referred to, the rolling of the sleeve will result in a reduction in its diameter and will improve its characteristic of roundness. When the sleeve has traversed the space between the drum 12 and the body 18, it is free to drop downward into the chute mentioned before herein.

Manually operable apparatus

The manually operable apparatus shown in Figures 6 and 7 includes a flat base 26 on the upper surface of which is fixed a layer or body of resilient material 27 such as rubber. The base 26 and the body 27 have a width to accommodate the length of a desired sleeve.

Mounted for manual movement to the right and the left as viewed in Figure 6 over the body 27, is an assembly including arms 28, 29 extending downwardly against the sides of base 26, a backing support 30 adjustably fixed to arms 28, 29 and a pad 31 of resilient material such as rubber fixed to the backing support. The arms 28, 29 are provided with slots 28a, 29a, extending therethrough by means of which the backing support 30 and its pad 31 may be raised or lowered in relation to the resilient body 27. The arms 28, 29 may ride at their lower ends on rails 28b, 29b. The assembly also includes a roller 32 mounted for rotation on a pair of brackets, one of which 33 is shown. The brackets referred to may be pivotally mounted on arms 28, 29 as shown, in which event pressure on the roller is transmitted through the backing support 30 and pad 31. Alternately the brackets 33 may be fixed to the arms 28, 29 in which event pressure on the roller is transmitted through the brackets referred to. While the roller 32 is thus fixed against relative rectilinear movement with respect to the pad 31 it is permitted rotation and rectilinear movement with respect to the resilient body 27. The roller 32 is disposed adjacent one end of the pad 31.

The space between the facing surfaces of the pad 31 and the resilient body 27 is smaller at the ends thereof remote from the roller 32, the purpose for which will become clear as the description continues. The base 26 and the resilient body 27 thereon may be of considerable length to permit successive forming of a plurality of blanks into sleeves during one directional movement of the upper assembly thereon.

Operation of manually operable apparatus

Operation of the manually operable apparatus involves moving the upper assembly including the brackets 28, 29, the backing support 30, the pad 31 and the roller 32 back and forth to the right and left as viewed in Figure 6 on the base 26 and the body 27, with the operator exerting a predetermined downward pressure on the backing support 30. During such back and forth movements of the upper assembly referred to the arms 28, 29 are engaged by the sides of the base 26, to guide the travel of the assembly on the upper surface of the resilient body 27 on the base 26. Movement of the upper assembly to the right as viewed in Figure 6 results in the formation of sleeves from blanks 11 while movement of the upper assembly to the left is a return movement thereof during which no blanks are formed.

At the start of a sleeve forming operation the upper assembly is disposed to the left, reference being had to Figure 6, and one or more blanks 11 are placed in end to end relation along the upper surface of the resilient body 27. The upper assembly is then moved to the right with the roller 32 engaging the surface of body 27 and partly embedded therein. During such movement the roller will successively travel over the blanks 11, forcing each blank successively into the arcuate space defined between the roller and the body 27. When the leading end of a blank emerges from this space it will retain after springback some of the curvature received by its forced entry into said space, since such curvature exceeds the elastic limit of the material of the blank. The curvature thus remaining in the blank will cause its leading end to travel toward the pad 31 by which it will be given a further curvature. Further movement of the roller 32 and pad 31 along the surface of the body 27 will result in the formation of a sleeve at a location spaced from the roller. Continued movement of the pad 31 on body 27 will result in a rolling of the sleeve between the opposed surfaces of these parts. Due to the convergence of pad 31 and the body 27 adjacent the rear end of the pad, the space between the pad and body referred to through which the sleeve is caused to travel by the relative movement of these elements, becomes successively smaller thereby reducing the diameter of the sleeve. This rolling to which the sleeve is subjected also improves roundness of the sleeve. Further travel of the upper assembly to the right results in emergence of a finished sleeve from the rear end of the assembly.

The manually operable apparatus is advantageous in several respects. The pressure of the roller on the resilient body 27 is determined by the force exerted by the operator on the backing support 30 and can be quickly adjusted to the requirements of a particular blank. Where short runs of sleeves made by blanks of different moduli of elasticity are desired, the ready pressure adjustments of the manually operable apparatus are of advantage. While the automatically operable apparatus is also capable of adjustment to vary the pressure of the roller 19 on the resilient body 15, the adjustment is not as quickly effected and hence the relatively large number of adjustments that would be necessary would adversely affect the efficiency of the apparatus.

Another advantage of the manually operable apparatus is its suitability for service as a pilot device for quickly determining the pressure conditions required in the automatically operable apparatus for a given group of blanks having similar characteristics of elasticity. In this use a pressure meter, not shown, may be interposed between the operator's hand and the backing support 30 to indicate the pressure applied. The screw 23 of the automatically operable apparatus may then readily be adjusted to provide the desired pressure between the roller 19 and the resilient body 15 indicated by the meter.

General considerations

It will be appreciated from the foregoing description of structure and operation of two forms of apparatus embodying our invention, that certain factors are similar in both forms. Thus each form of our novel apparatus requires two spaced and relatively movable converging surfaces of resilient material and a roller partly embedded in one of the surfaces. In each case the pressure of the roller on said one of the surfaces is adjustable.

In addition, in each embodiment of the invention described, the roller is mounted adjacent one end of one of the facing surfaces of the apparatus, and said one of the surfaces is pivotally supported adjacent its other end. The pivotal mounting of this surface, while adjustable to vary the space between the facing surfaces, is fixed during a sleeve forming operation. The spacing between the facing surfaces during a sleeve forming operation is therefore solely modified by the pressure on the rollers 19 and 32 resulting in embedment of the rollers in one of the surfaces.

As a consequence of the arrangement whereby the roller is mounted adjacent one end of one of the surfaces and this surface is pivotally mounted adjacent its other end, displacements occurring between the surfaces adjacent said one end in response to pressure on the roller are appreciably greater than the displacements taking place at the other end. Since the sleeve diameter is determined by the spacing at said other end, adjustments on the pressure on the rollers will have a negligible effect on the diameter of processed sleeves.

Several additional important parameters generally characterize our novel apparatus. For example, elasticity of the resilient surfaces in each form of our apparatus is related to the thickness and modulus of elasticity of the blank material to be formed into sleeves. It is obvious that a thick blank having relatively low order of elasticity could not be given a curvature by a body having a highly resilient character in association with a roller. The elasticity of the surface referred to is also critical in relation to the pressure on the roller. If the resiliency of the surface engaged by the roller is excessive a predetermined pressure thereon by the roller would cause the roller to become embedded too deeply into the body for successful operation of our apparatus.

We have found generally the following parameters to be desirable. The pressure applied to the roller should be such to exceed the elastic limit of the blanks to be formed into sleeves so that a sustained bend or curvature in the blank material can be produced. The material of which the pad or body engaging the roller is made, should have an elasticity to permit the roller to extend about one third of its diameter into the material. The roller diameter should preferably be from 105 to 110% of the desired rolled diameter of a finished sleeve.

Two examples giving specific values to the parameters involved in the two forms of apparatus, according to the invention, are given below:

One example employed blanks made of an alloy of nickel, iron and cobalt and known in the trade as Kovar. The blanks were .0005" thick. The material as received commercially was annealed in hydrogen at a temperature of about 800° for about 15 minutes. The roller employed in our apparatus had a diameter of .025". The surface engaged by the roller was made of relatively soft rubber and a pressure of 20 ounces was applied to the roller causing it to sink about one third of its diameter into the surface referred to. The narrower end of the space defined by the converging surfaces of our apparatus involved a spacing between the surfaces of about .024". Successful operation of our apparatus occurred under these conditions and good sleeves were made.

Another example involved blanks of similar material as those used in the previous example, and annealed in like manner. In this instance, however, a roller of .035" diameter was used and a minimum spacing between the surfaces of resilient material was .032"±.001". The pressure on the roller was 1.75 pounds. The resiliency of the pad or body engaged by the roller had a Durameter value of 55 to permit the roller to be embedded to about one third its diameter into the pad referred to. It will be noted that the larger diameter roller included in this example requires a greater pressure than in the first example for penetrating the surface of the resilient pad it engages to a distance equivalent to about one third of its diameter.

While our novel apparatus and method are particularly advantageous in making relatively small size sleeves they are also serviceable in forming relatively large sleeves from blanks that are relatively thick and have a high resistance to bending. Theoretically there is no limit to the size of sleeves capable of being formed by the method and apparatus of the invention. However, while relatively large size sleeves can be formed by other methods, no successful alternatives are available for the forming of extremely small sleeves of the order of .025" or smaller. The absence of alternatives is due it is believed to the fact that when the sleeve is reduced to a minute size difficulties of removal of the sleeve from the mandrel that alternative methods require are so pronounced as to render such alternatives impracticable.

The foregoing examples have involved the formation of cylindrical sleeves. In these examples the roller has engaged a transverse portion of the blank extending parallel to the leading edge of a rectangular blank. By modifying the direction of feed of the blank material and providing such blank material in substantial length, it is feasible according to the invention to form a sleeve constituted by a helical array of a plurality of turns of the blank material in edge engagement. Thus if the elongated blank material is fed between the roller and the resilient material in which the roller is partly embedded, in such a manner that the angle formed by the longitudinal axis of the material and the axis of the roller is less than 90 degrees, the helical structure referred to will be formed by our apparatus.

It is recognized that many further modifications may be made in our apparatus and method by persons skilled in the pertinent art without departing from the spirit of our invention, and we accordingly desire to include such modifications within the scope of the appended claims.

We claim:

1. Apparatus for forming a flat sheet metal blank into a sleeve, comprising a member having a resilient face and a roller movable with respect to said member, said roller engaging said surface in a curved plane to provide a normally closed curved path, whereby said stock force-fed between said roller and member in said curved path is given a curvature and further fed, and another member having a resilient face oppositely disposed with respect to the resilient face of the first named member and extending transversely of said roller and adjacent thereto, whereby said another member is adapted to engage said further fed stock to further curve the same to sleeve shape.

2. Apparatus for forming flat metal stock into sleeve shape, comprising two spaced members having facing surfaces of resilient material defining a passageway having an entrance, and a free wheeling roller in said passageway, said members being relatively movable in a predetermined plane, said roller being disposed axially normal to said plane and engaging one of said members with appreciable pressure for partial embedment therein, whereby stock fed to said passageway through said entrance and between said roller and said one of said members is bent, and fed further to the other of said members, said other of said members including a portion spaced from said roller, and adapted to engage said further fed bent stock and form the same to sleeve shape.

3. Apparatus for forming flat metal stock into sleeve shape according to claim 2 and wherein said surfaces extend appreciably from said entrance and from and transversely of said roller and converge as they recede from said entrance and roller, whereby said stock is rolled to form sleeves of smaller diameter than said roller.

4. Apparatus for forming flat metal stock into sleeve shape, comprising two spaced members having resilient facing surfaces defining a passageway for receiving an edge of said stock, said members being relatively movable without disturbing the dimensions of said passageway, a roller in said passageway extending transversely of the direction of the relative movement of said members and engaging one of said surfaces with appreciable pressure, whereby said roller is partly embedded into said one of said surfaces, and means for feeding said stock between said roller and said one of said surfaces, whereby said stock is bent and fed in a direction toward the other of said surfaces at a location thereon removed from said roller, for further bending said stock, continued relative movement of said surfaces causing said stock to be rolled therebetween to form a sleeve.

5. Apparatus for forming sleeves from flat sheet metal stock comprising two relatively movable and spaced members, said members having surfaces of resilient material in face relation, and a roller disposed between said surfaces and partly embedded under pressure in one of said surfaces, said roller being mounted for rotation, and being rectilinearly movable with respect to said one of said surfaces and fixed rectilinearly with respect to the other of said surfaces whereby said roller is rotated by said one of said surfaces, said roller and said one of said surfaces forming a mouth for receiving said stock and for causing said stock to travel between said roller and said one of said surfaces, whereby said stock is bent and first directed to the other of said surfaces and then back to said one of said surfaces for the formation of a sleeve.

6. Apparatus for fabricating a sleeve from a flat sheet metal blank, comprising a member having a resilient surface, a support for pivotally supporting said member adjacent one end thereof, a roller mounted on said support and engaging said surface adjacent the other end of said member, said roller being fixed against rectilinear movement with respect to said member, whereby the displacement of said one end of said member in response to pivotal movement of the member is of smaller magnitude than the displacement of said member at said other end thereof, and an additional member having a resilient surface facing the surface of said first-named member and spaced therefrom by said roller and urged against said roller, whereby said roller is partly embedded in the surface of said additional member, the facing surfaces of said members converging as they recede from said roller, said members being relatively movable without disturbing the spacing between said surfaces, whereby said roller is caused to rotate, said roller and the first-named member receiving said blank therebetween for bending said blank and directing its travel to the resilient surface of said additional member at a location thereon remote from said roller for further bending said blank and rolling the same to sleeve form.

7. Apparatus in accordance with claim 6 and wherein the facing surfaces of said members are arcuate and one of said members comprises a drum mounted for rotation.

8. Apparatus in accordance with claim 6 and wherein the facing surfaces of said members are planar.

9. Method of forming a sheet metal stock to sleeve shape comprising the steps of forcing said stock between a body of relatively soft material and a cylinder of relatively hard material embedded in said body to provide a curvature in a leading portion of said blank, and thereafter rolling said blank between said body and another body of relatively soft material, with said leading portion engaging said another body and a trailing portion of said stock engaged between said first-named body and said cylinder at the start of a rolling operation.

10. Method of forming a sheet metal stock to sleeve shape comprising the steps of forcing said stock between members normally in resilient arcuate contact engagement and movable to pull said stock therethrough to provide a curvature in said stock of larger radius than the curvature of said arcuate engagement, and rolling the curved stock between one of said members and another member spaced from each other a distance less than double said larger radius, said stock being engaged by said another member before the stock is disengaged from said first named members, for rolling said stock to sleeve shape.

EDWARD C. CICHOSKI.
WILLIAM C. DALE.

References Cited in the file of this patent

UNITED STATES PATENTS

| Number | Name | Date |
|---|---|---|
| 590,857 | Potter | Sept. 28, 1897 |
| 711,180 | Seymour | Oct. 14, 1902 |
| 1,126,982 | Goss | Feb. 2, 1915 |
| 1,936,454 | Klocke | Nov. 21, 1933 |
| 2,397,608 | Johnson | Apr. 2, 1946 |

FOREIGN PATENTS

| Number | Country | Date |
|---|---|---|
| 584,593 | Germany | Sept. 21, 1933 |